(12) United States Patent
Nishioka et al.

(10) Patent No.: US 9,575,513 B2
(45) Date of Patent: Feb. 21, 2017

(54) ELECTRONIC DEVICE AND APPARATUS

(71) Applicant: Kabushiki Kaisha Toshiba, Minato-ku, Tokyo (JP)

(72) Inventors: Hisaya Nishioka, Hamura Tokyo (JP); Masataka Tokoro, Tachikawa Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/685,239

(22) Filed: Apr. 13, 2015

(65) Prior Publication Data
US 2016/0062414 A1    Mar. 3, 2016

(30) Foreign Application Priority Data
Aug. 29, 2014  (JP) .................. 2014-176321

(51) Int. Cl.
*G06F 1/06*  (2006.01)
*G06F 1/16*  (2006.01)

(52) U.S. Cl.
CPC ........... *G06F 1/1669* (2013.01); *G06F 1/1616* (2013.01)

(58) Field of Classification Search
CPC ........ G06F 1/1632; G06F 21/31; G06F 21/86; G06F 1/1616; G06F 1/1643; G06F 1/1647; G06F 1/1656; G06F 1/1626; G06F 1/1641; G06F 1/1679; G06F 1/1649; G06F 1/1615; G06F 1/1628; G06F 1/1696; G06F 1/1698; G06F 1/162; G06F 1/1683; G06F 1/1662; G06F 1/1677; G06F 1/1637; G06F 1/1607; G06F 1/1654; G06F 1/1669; H05K 1/0259; H05K 5/0247; H05K 7/00; H05K 5/0017; H05K 5/0204
USPC ............. 361/679.01, 679.02, 679.09, 679.21,361/679.26, 679.27, 679.55–679.58, 724–727,361/679.41; 248/917–924
See application file for complete search history.

(56) References Cited

U.S. PATENT DOCUMENTS

| | | | |
|---|---|---|---|
| 6,937,468 B2 * | 8/2005 | Lin | G06F 1/1632 361/679.41 |
| 8,644,018 B2 * | 2/2014 | Hung | G06F 1/1632 16/302 |
| 8,922,994 B2 * | 12/2014 | Zawacki | G06F 1/1683 292/30 |

FOREIGN PATENT DOCUMENTS

| | | |
|---|---|---|
| JP | 11-073242 A | 3/1999 |
| JP | 11-194852 A | 7/1999 |
| JP | 2000-267762 A | 9/2000 |

* cited by examiner

*Primary Examiner* — Anthony Haughton
*Assistant Examiner* — Ingrid Wright
(74) *Attorney, Agent, or Firm* — Knobbe, Martens, Olson & Bear, LLP (57) ABSTRACT

According to one embodiment, an electronic device includes a first housing, a second housing, a third housing and a first movable member. The first housing includes a first opening through which the electronic device is capable of being coupled to an external coupling apparatus. The second housing is rotatably connected to the first housing. The third housing is removably attached to the second housing. The first movable member is across the first housing and the second housing, movable between a first position at which the third housing is locked to the second housing and a second position at which the third housing is capable of being unlocked from the second housing, and is configured to be restricted from moving from the first position to the second position when the electronic device is coupled through the first opening.

5 Claims, 10 Drawing Sheets

ELECTRONIC DEVICE AND APPARATUS

CROSS-REFERENCE TO RELATED APPLICATIONS

This application is based upon and claims the benefit of priority from Japanese Patent Application No. 2014-176321, filed Aug. 29, 2014, the entire contents of which are incorporated herein by reference.

FIELD

Embodiments described herein relate generally to an electronic device and an apparatus.

BACKGROUND

Conventionally, there has been known an electronic device on which a coupling apparatus can be mounted. Here, the coupling apparatus is an apparatus that restricts movement of one housing as well as prevents other housing from being removed from the one housing.

Regarding such a structure, an electronic device or an apparatus is preferred to have, for example, a novel configuration that can restrict the movement of the housing in simple way or that can lock another member.

BRIEF DESCRIPTION OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

In general, according to one embodiment, an electronic device comprises a first housing, a second housing, a third housing and a first movable member. The first housing comprises a first opening through which the electronic device is capable of being coupled to an external coupling apparatus. The second housing is rotatably connected to the first housing. The third housing is removably attached to the second housing. The first movable member is across the first housing and the second housing, movable between a first position at which the third housing is locked to the second housing and a second position at which the third housing is capable of being unlocked from the second housing, and is configured to be restricted from moving from the first position to the second position when the electronic device is coupled through the first opening.

An exemplary embodiment is described in the following. It is to be understood that configurations of the embodiment to be described hereunder and effects and results achieved by the configurations are intended to be illustrative only. The invention can be achieved by any configuration other than those disclosed in the embodiment. Additionally, the invention can achieve at least one of the various effects (including derivative ones) achieved by the configurations.

In the embodiment, an electronic device will be exemplified as being configured as a personal computer. This is, however, not the only possible arrangement. The electronic device in the embodiment may be configured as one of various types of electronic devices, such as, a smart TV, a portable telephone, an electronic dictionary, a video display, and a TV telephone.

Figure 1:
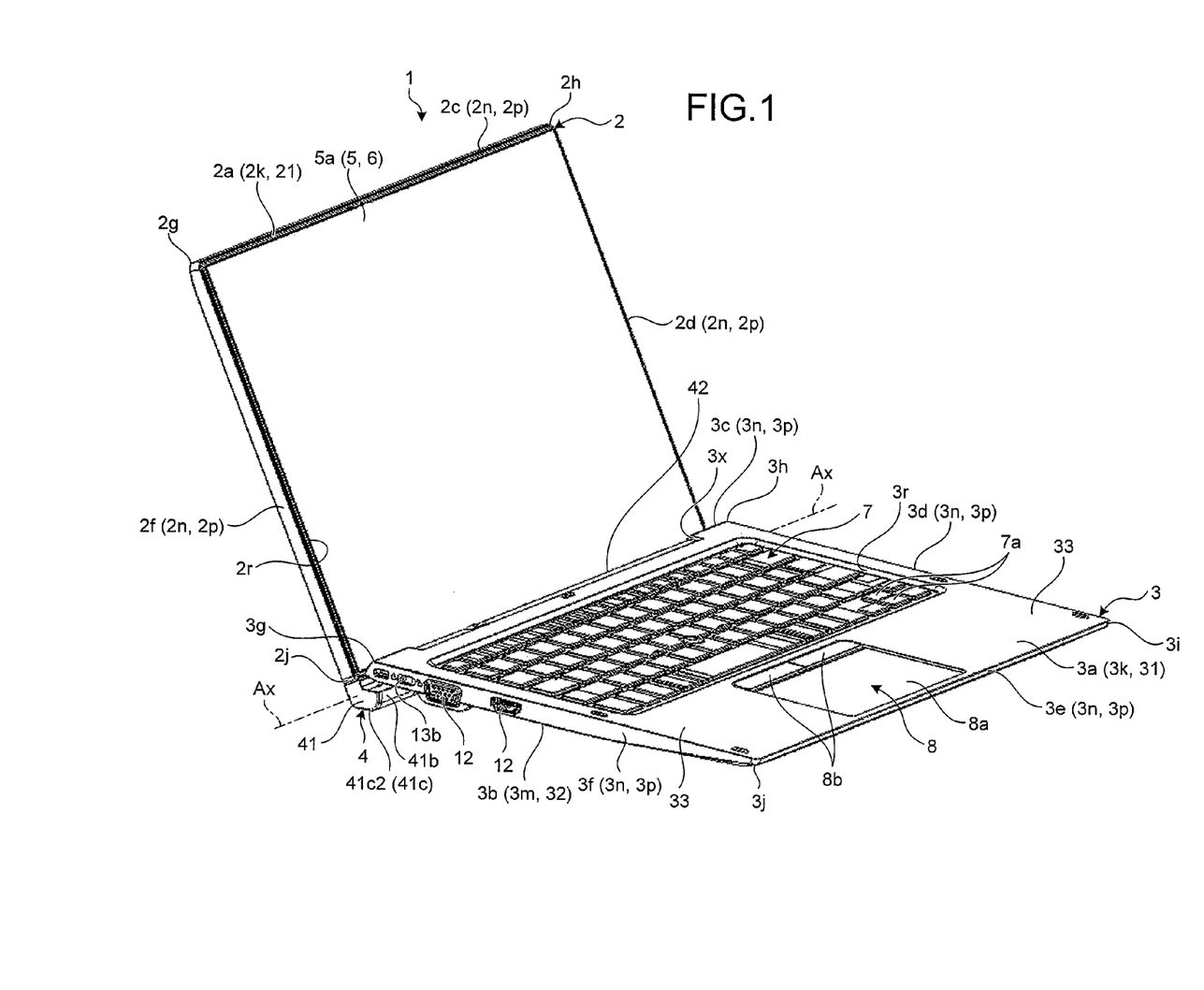
FIG. 1 is an exemplary perspective view of an electronic device in an opened position as viewed from a front side, according to an embodiment.
Figure 2:
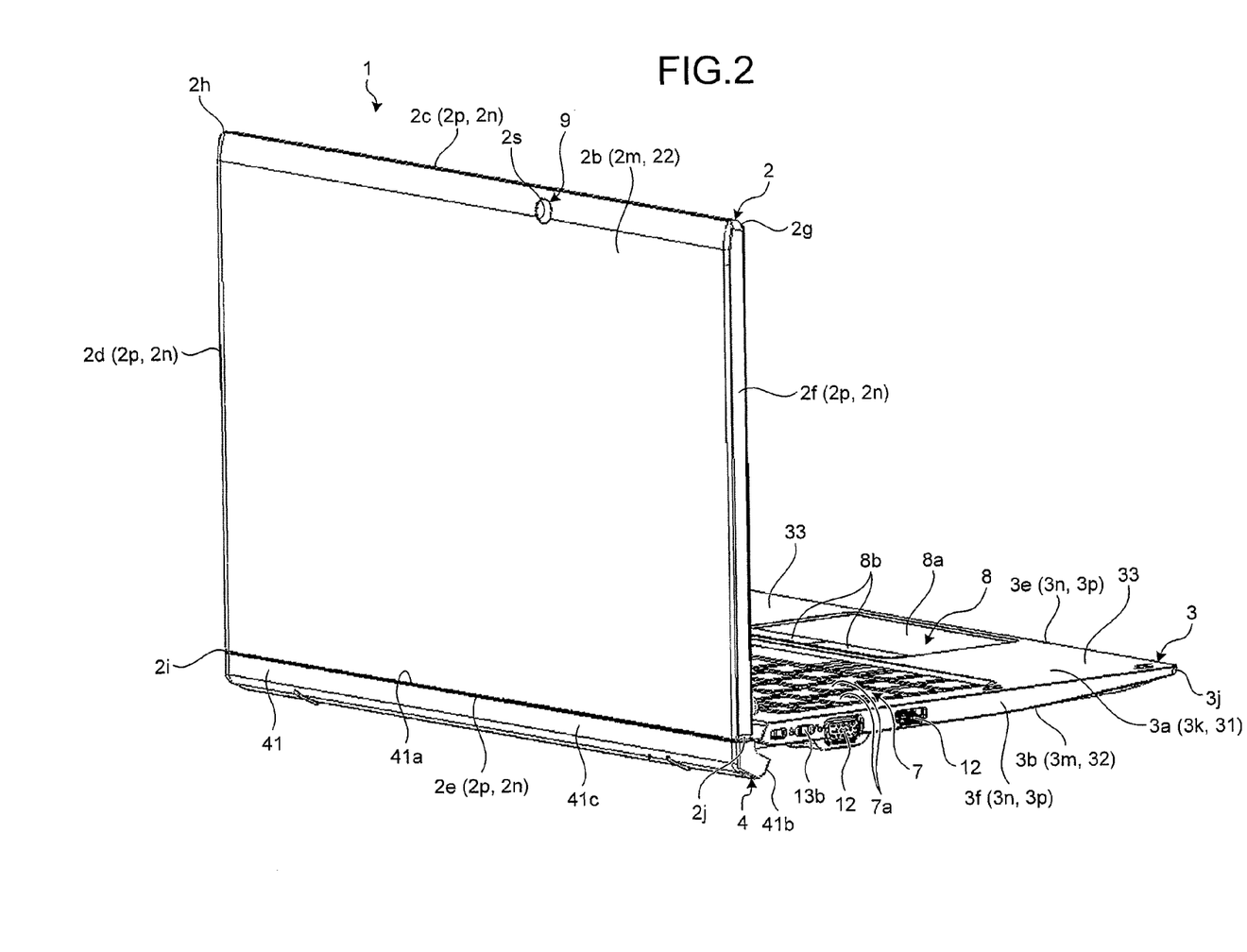
FIG. 2 is an exemplary perspective view of the electronic device in the opened position as viewed from a rear side, in the embodiment.
Figure 3:
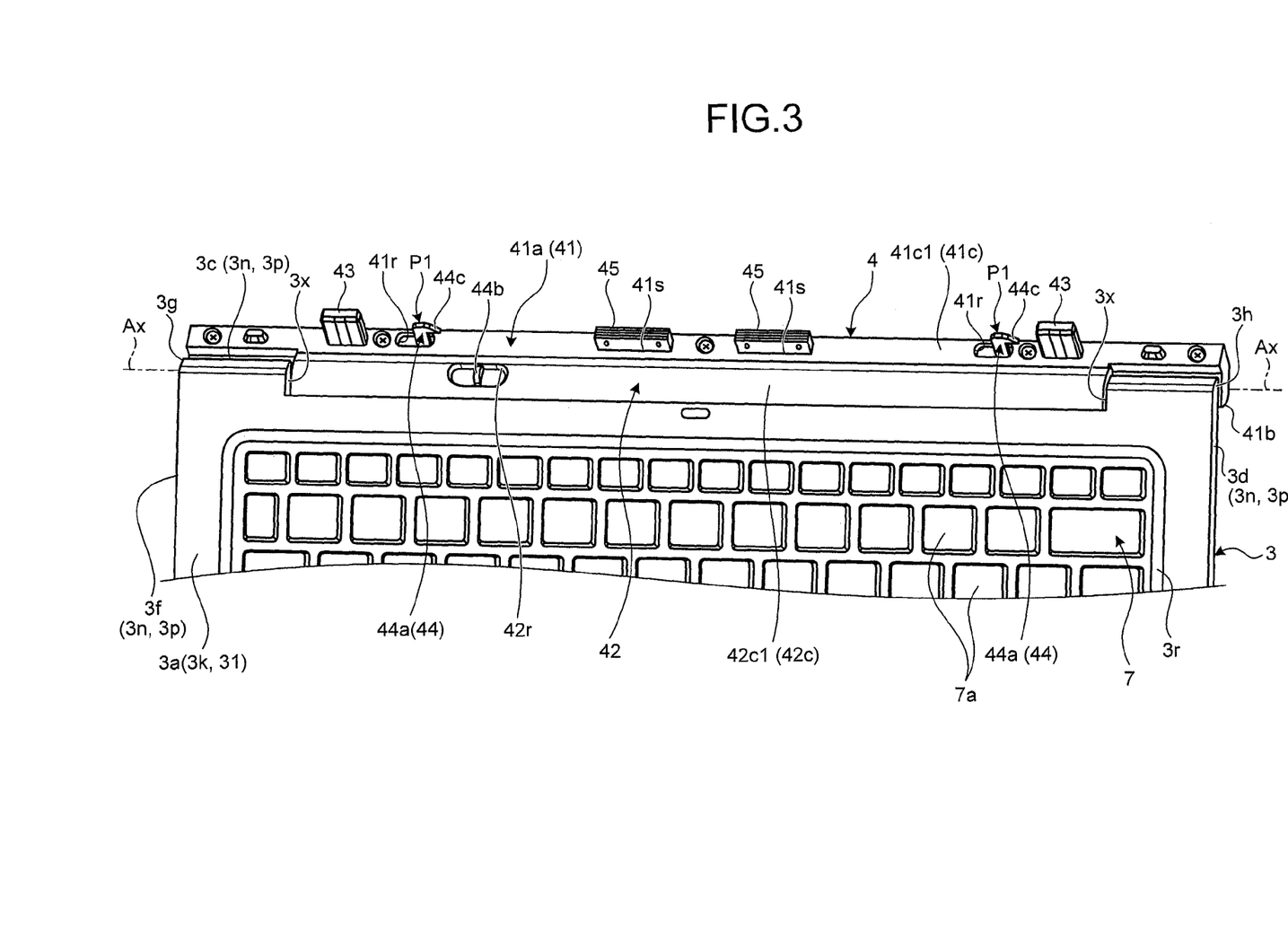
FIG. 3 is an exemplary plan view of a second housing of the electronic device and illustrating a locked position (a first position) at which hook portions lock a third housing, in the embodiment.
Figure 7:
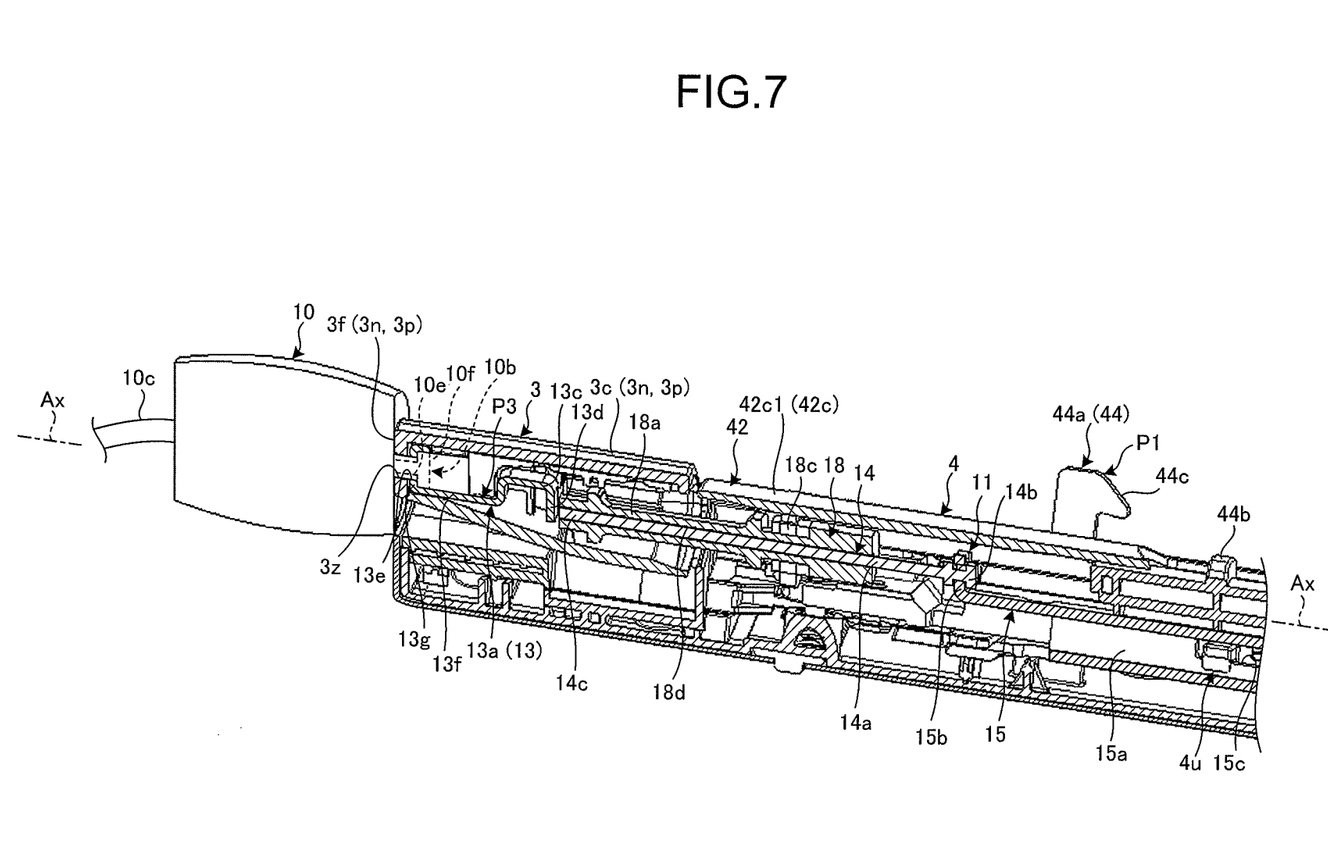
FIG. 7 is an exemplary cross-sectional view of a first housing and the second housing of the electronic device and illustrating a locked position (a third position) at which a second movable member locks a first movable member, in the embodiment.

As illustrated in FIGS. 1 to 3, an electronic device 1 (unit) comprises, for example, a housing 2 (a unit, a component), a housing 3 (a unit, a component), and a housing 4 (a connector, an intermediate portion, a component). The housing 2 comprises, for example, a display 5 or a touch panel 6. A user or the like can visually recognize a picture (an image) displayed on the display 5 via the touch panel 6. The housing 2 is, for example, a tablet-type personal computer. The housing 3 comprises a key module 7, an input operating portion 8, or the like. Referring to FIG. 7, in the embodiment, a hinge 18 (a hinge apparatus), for example, is provided between the housing 3 and the housing 4. The housing 4 is connected to the housing 3 via the hinge 18 rotatably about the rotational center Ax. The housing 2 can be removably coupled (connected) to the housing 4 connected to the housing 3. In the embodiment, the housing 3 is an exemplary first housing and an exemplary first component, the housing 4 is an exemplary second housing and an exemplary second component, and the housing 2 is an exemplary third housing.

The electronic device 1 can be used, for example, in a tablet mode (not illustrated) in which the housing 2 and the housing 3 are not coupled to each other or in a clamshell mode (a notebook mode, see FIGS. 1 and 2) in which the housing 2 and the housing 3 are coupled to each other. In the clamshell mode, the housing 4 on which the housing 2 is mounted and the housing 3 are relatively rotated, which allows the electronic device 1 to be transformed into an opened position (see FIG. 1) in which the housing 2 and the housing 3 are extended or a folded position (not illustrated)

in which the housing 2 and the housing 3 are folded. In the folded position, the housing 2 and the housing 3 overlap each other in a thickness direction. In the folded position, a face 2a of the housing 2 and a face 3a of the housing 3 overlap each other in a condition of facing each other and the display 5, the touch panel 6, the key module 7, the input operating portion 8, and the like are hidden in the housing 2 and the housing 3. In the opened position, the face 2a of the housing 2 and the face 3a of the housing 3 are exposed, which allows the display 5, the touch panel 6, the key module 7, the input operating portion 8, and the like to be usable (visually recognizable or operable).

In the clamshell mode, electric components (e.g., a circuit board) housed inside the housing 2 are electrically connected to electric components (e.g., the key module 7 and the input operating portion 8) housed inside the housing 3 via a conductor, a harness, or a conductive part of a flexible printed wiring board not illustrated. In the clamshell mode, the housing 3 expands functions of the housing 2. Specifically, the housing 3 is an exemplary function expansion device (a cradle, a dock, a docking station). It is noted that data obtained by an input operation through, for example, the key module 7 or the input operating portion 8 may be input to the circuit board in the housing 2 via a wireless communication mechanism (e.g., a transmission and reception circuit and an antenna).

As illustrated in FIGS. 1 and 2, the housing 2 exhibits a quadrilateral (e.g., a rectangular) appearance in a front view and a rear view. Additionally, the housing 2 is formed into a flat rectangular parallelepiped that is thin in a front-to-rear direction (in the thickness direction of the housing 2). The housing 2 has the face 2a (a front face, a fore face, a surface, a face portion) and a face 2b (a back face, a rear face, a reverse face, a face portion) opposite thereto. The face 2a and the face 2b extend substantially in parallel with each other. The housing 2 has four ends 2c to 2f (sides, edges) and four corners 2g to 2j (pointed portions, bent portions, end portions) in the front and rear views.

In addition, the housing 2 has a wall 2k (a portion, a plate, a frame, a fore wall, an obverse wall, a top wall) having the face 2a and a wall 2m (a portion, a plate, a rear wall, a reverse wall, a bottom wall) having the face 2b. The walls 2k and 2m each have a quadrilateral shape (e.g., a rectangular shape). Additionally, the housing 2 has four walls 2n (portions, plates, side walls, end walls, vertical walls, extended portions). The walls 2n have faces 2p (side faces, circumferential faces) extending across the wall 2k and the wall 2m. The wall 2k has, for example, a quadrilateral opening 2r formed therein. Thus, the wall 2k is shaped into a quadrilateral shape and a frame shape.

The housing 2 may comprise, for example, a plurality of components (divided bodies) combined with each other. Specifically, the housing 2 for example comprises a first housing member 21 (a first portion, a fore member, a mask, a masking portion, a cover, a front cover, a covering portion, a first area) that comprises at least the wall 2k and a second housing member 22 (a second portion, a rear member, a base, a base portion, a bottom, a bottom portion, a cover, a rear cover, a covering portion, a second area) that comprises at least the wall 2m. The walls 2n are comprised in at least one of the first housing member 21 and the second housing member 22 (for example, the second housing member 22). The housing 2 may be formed of, for example, a metallic material or a synthetic resin material.

The housing 2 houses therein at least a portion of the display 5. The display 5 has a display screen 5a. The display screen 5a is provided on the side of the face 2a of the housing 2 and exposed to the front (to the outside) of the housing 2 through the opening 2r. The user or the like can visually recognize the display screen 5a through the opening 2r from the front side. The display 5 is formed into a quadrilateral shape (e.g., a rectangular shape) in a front elevational view. In addition, the display 5 is formed into a flat rectangular parallelepiped that is thin in the front-to-rear direction (in the thickness direction of the housing 2). The display 5 may for example include a liquid crystal display (LCD) and an organic electro-luminescent display (OELD).

In the embodiment, for example, the touch panel 6 (a touch sensor, an input operating panel, an operating surface, a cover) is provided at the front of the display 5 (on the side of the face 2a of the housing 2). The touch panel 6 is formed into a transparent, relatively thin quadrilateral shape and covers the display screen 5a. The user or the like can perform an input operation by, for example, touching, pressing, or rubbing the touch panel 6 with a finger or a device (e.g., a stylus) or by moving a finger or a stylus near the touch panel 6. Light emitted from the display screen 5a of the display 5 passes through the touch panel 6 and leaves the opening 2r in the wall 2k to the front (outside) of the housing 2.

In the embodiment, for example, a camera module 9 (a camera unit, a camera assembly, a camera, an imaging device) is housed on a rear side (a back side, the side behind, the wall 2m side, the side opposite the display screen 5a) of the display 5 inside the housing 2. The camera module 9 is exposed through an opening 2s in the wall 2m. Additionally, an electric component different from the camera module 9 can be housed inside the housing 2. Examples of the electric component may include a circuit board (a board, a printed board, a control board), a wire (e.g., a cable, a harness, a flexible cable, a flexible printed wiring board), a battery module (a battery, an assembled battery, a cell, a module, a battery pack, a battery unit), a speaker module (a speaker unit, a speaker assembly, a speaker, a voice output device), and an antenna module (an antenna unit, an antenna assembly, an antenna, a first transmission and reception module). These electric components can be electrically connected to each other through wires.

Referring to FIGS. 1 and 2, the housing 3 is formed into a quadrilateral shape (e.g., a rectangular shape) in the front view and the rear view. Additionally, the housing 3 is formed into a flat rectangular parallelepiped that is thin in the vertical direction (in the thickness direction of the housing 3). The housing 3 has the face 3a (a front face, an upper face, a surface, a face portion) and a face 3b (a back face, a rear face, a reverse face, a face portion) opposite thereto. The face 3a and the face 3b extend substantially in parallel with each other. The housing 3 has four ends 3c to 3f (sides, edges) and four corners 3g to 3j (pointed portions, bent portions, end portions) in the front and rear views.

For example, the housing 3 has a wall 3k (a part, a plate, a frame, a fore wall, an obverse wall, a top wall) having the face 3a and a wall 3m (a part, a plate, a rear wall, a reverse wall, a bottom wall) having the face 3b. The walls 3k and 3m each have a quadrilateral shape (e.g., a rectangular shape). Additionally, the housing 3 has four walls 3n (parts, plates, side walls, end walls, vertical walls, extended portions). The walls 3n have faces 3p (side faces, circumferential faces) extending across the wall 3k and the wall 3m. The wall 3k has, for example, a quadrilateral opening 3r formed therein. Thus, the wall 3k is shaped into a quadrilateral shape and a frame shape.

The housing 3 may comprise, for example, a plurality of components (divided bodies) combined with each other.

Specifically, the housing 3 exemplarily comprises a first housing member 31 (a first portion, a fore member, a mask, a masking portion, a cover, a front cover, a covering portion, a first area) that comprises at least the wall 3k and a second housing member 32 (a second portion, a rear member, a base, a base portion, a bottom, a bottom portion, a cover, a rear cover, a covering portion, a second area) that comprises at least the wall 3m. The walls 3n are comprised in at least one of the first housing member 31 and the second housing member 32 (for example, the second housing member 32). The housing 3 may be formed of, for example, a metallic material or a synthetic resin material.

The housing 3 houses therein at least a portion of the key module 7 (a key unit, a keyboard module, a keyboard unit). The key module 7 comprises a plurality of keys 7a (operating portions). The keys 7a are supported by a supporting member (not illustrated) so as to pop up therefrom and down thereinto (to be projected therefrom and retracted thereinto, to be displaceable). The keys 7a are exposed to the front (outside) of the housing 3 through the opening 3r. For example, according to the embodiment, the key module 7 is provided close to the side of the end 3c of the face 3a and the input operating portion 8 is provided close to the side of the end 3e (the side opposite to the end 3c) of the face 3a.

The input operating portion 8 comprises, for example, a pointing device 8a (a touch pad, a touch panel) and a click button 8b (a button). The pointing device 8a has a quadrilateral shape (e.g., a rectangular shape) and is provided on the side of the end 3e. The click button 8b has a quadrilateral shape (e.g., a rectangular shape) and is provided on the side of the opening 3r (the side of the key module 7). In the embodiment, the click button 8b is provided in plurality (e.g., two) and the click buttons 8b are juxtaposed along the end 3e. Additionally, palm rests 33 (placement portions) are provided on both sides of the input operating portion 8 on the wall 3k (on both sides in the direction extending along the end 3e). The palm rests 33 are portions on which the user rests his or her hands and are formed in flat manner (in a plate shape).

According to the embodiment, for example, the housing 3 houses therein at least one substrate 34 (a circuit board, a control board, a printed board; see FIG. 9) at the back (the back side, the side behind, the wall 3m side) of the key module 7. The substrate 34 extends substantially in parallel with the key module 7. The substrate 34 is spaced away from the walls 3k, 3m, and 3n; specifically, a space (a gap) is formed between the substrate 34 and each of the walls 3k, 3m, and 3n. A plurality of components (not illustrated) can be mounted on the substrate 34, such as a central processing unit (CPU), a graphic controller, a power source component, a platform controller hub (PCH), a memory slot connector, an LCD connector, an input/output (I/O) connector, a power source coil, an element, and a connector. Examples of a control circuit may include a picture signal processing circuit, a tuner, a high-definition multimedia interface (HDMI, a registered trademark) signal processor, an audio video (AV) input terminal, a remote control signal receiver, a control unit, a selector, an on-screen display interface, a storage (e.g., a read only memory (ROM), a random access memory (RAM), a hard disk drive (HDD), a solid state drive (SSD)), and a voice signal processing circuit.

In the embodiment, for example, an electric component different from the substrate 34 can be housed inside the housing 3. Examples of the electric component may include a battery module (a battery, an assembled battery, a cell, a module, a battery pack, a battery unit), a speaker module (a speaker unit, a speaker assembly, a speaker, a voice output device), an antenna module (an antenna unit, an antenna assembly, an antenna, a second transmitter/receiver), and a wire (e.g., a cable, a harness, a flexible cable, a flexible printed wiring board). These electric components can be electrically connected to each other through wires.

Figure 5:
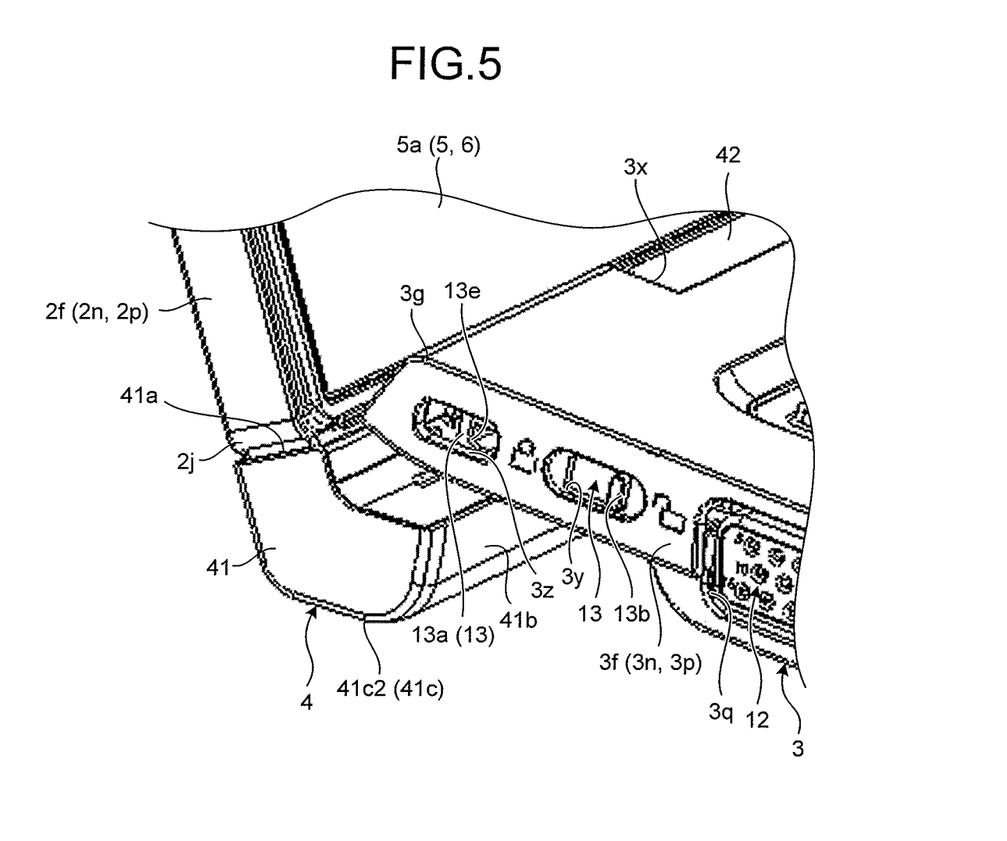
FIG. 5 is an exemplary enlarged view of a portion of FIG. 1, in the embodiment.

In the embodiment, connectors 12 and an operating portion 13b, for example, are provided on the face 3p on the end 3f of the housing 3. Examples of the connectors may include a power cable connector, a universal serial bus (USB) connector, a card connector, and earphone and microphone connectors. Examples of the operating portion 13b may include a slide switch, a pushbutton, a push switch, a pointing device, and a dial. As illustrated in FIG. 5, the face 3p on the end 3f of the housing 3 has an opening 3q, an opening 3y, an opening 3z, and the like formed therein. The opening 3q exposes the connector 12 therethrough. The opening 3y exposes the operating portion 13b therethrough. The opening 3z is an opening through which a hook member 10b (see FIG. 7) of a coupling apparatus is passing. The opening 3z is provided on the end 3f on the side of the corner 3g. The opening 3y is provided between the opening 3q provided on a central side (opposite to the opening 3z) on the end 3f, and the opening 3z. The openings 3y and 3z are each formed into a slot extending along the end 3f. In the embodiment, the opening 3z is an exemplary first opening.

In the embodiment, for example, the end 3c of the housing 3 has a recess 3x (an opening, a groove, a recessed groove, a cutout, a housing). The recess 3x is formed into a cutout opening in a direction opposite the end 3e. The recess 3x is provided substantially at the center of the end 3c, extending slenderly along the end 3c. In the embodiment, for example, the recess 3x has a length extending along the end 3c slightly shorter than the length of the opening 3r (key module 7) extending along the end 3c. As illustrated in FIG. 3, at least a portion (a second portion 42) of the housing 4 is inserted in the recess 3x.

As illustrated in FIG. 1, the housing 4 comprises, for example, a first portion 41 and the second portion 42. The first portion 41 is connected to either the housing 2 or the housing 3 (e.g., the housing 2) and the second portion 42 is connected to other one of the housing 2 and the housing 3 (e.g., the housing 3). The first portion 41 is provided outside of the recess 3x and extends slenderly across from the end 3d to the end 3f of the housing 3. As illustrated in FIGS. 1 and 2, the first portion 41 is formed substantially into a V-shape (substantially into a U-shape) in a line of sight extending in the direction extending along the end 3c (the rotational center Ax). In the embodiment, the housing 2 is coupled (connected) to either one (e.g., an end 41a) of two ends 41a and 41b (extreme ends) of the V-shape. As illustrated in FIG. 2, the end 41a extends along the end 2e of the housing 2. Additionally, as illustrated in FIG. 3, the end 41a comprises protrusions 43, hooks 44a (movable members 44), connectors 45, and the like that are connected to the housing 2.

The first portion 41 has a plurality of walls 41c (outer walls, portions, plates, frames). The walls 41c comprise, for example, a wall 41c1 (see FIGS. 3 and 4) that forms the end 41a described above and a wall 41c2 (see FIGS. 1 and 5) spaced apart from the wall 41c1 and placed on a placement surface not illustrated in the clamshell mode of the electronic device 1. Referring to FIG. 1, with the wall 41c2 placed on the placement surface in the clamshell mode, the end 3c of the housing 3 is spaced apart from the placement surface, while the end 3e of the housing 3 contacts the placement surface. Specifically, the housing 3 is inclined relative to the placement surface. Thus, operation of the key module 7 (keys 7a) may for example be easy as compared with a configuration in which the housing 3 extends in parallel with the placement surface in the clamshell mode.

Figure 4:
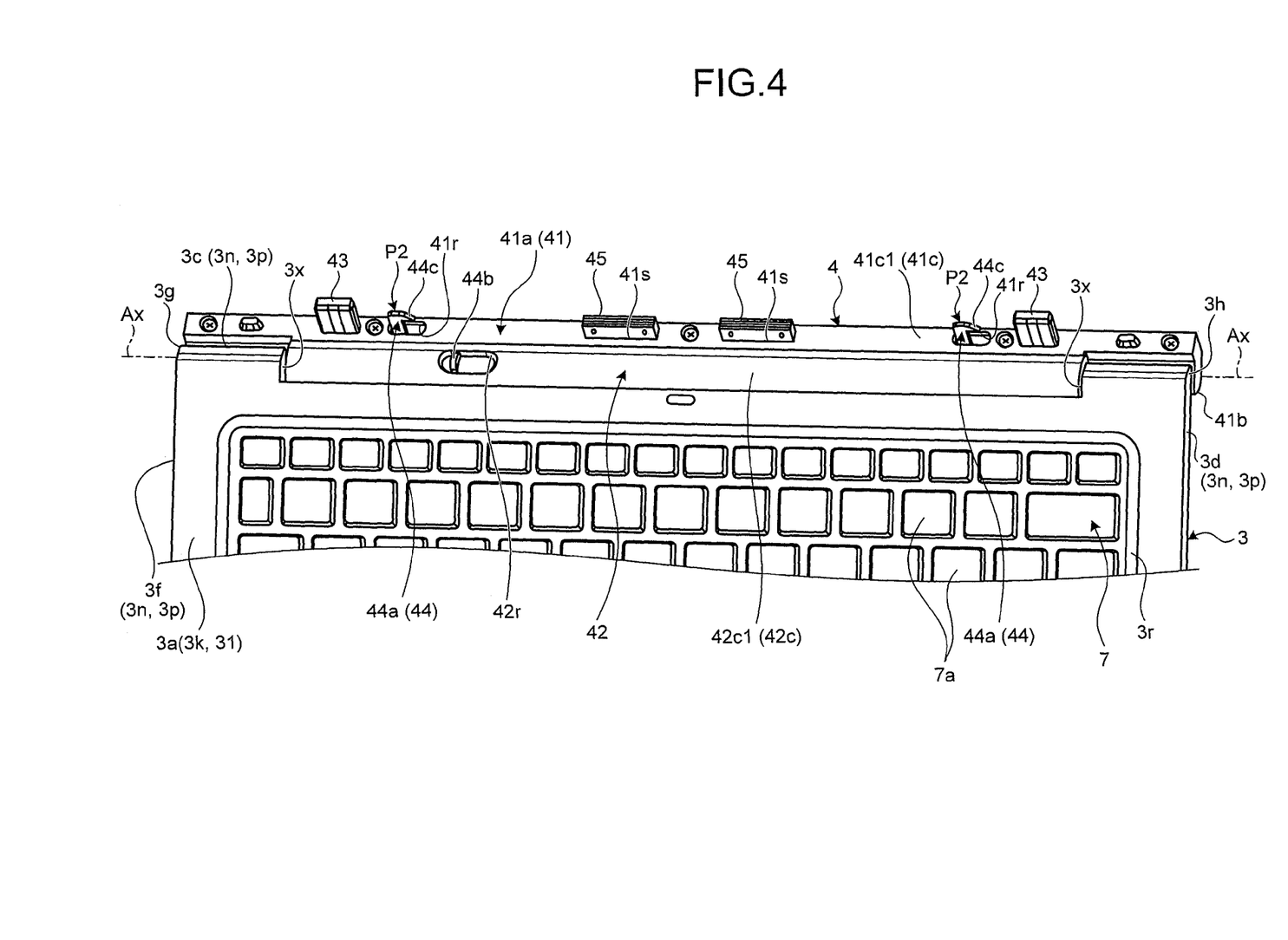
FIG. 4 is an exemplary plan view of the second housing of the electronic device and illustrating an unlocked position (a second position) at which the hook portions unlock the third housing, in the embodiment.

As illustrated in FIGS. 3 and 4, the second portion 42 protrudes from the first portion 41 toward the end 3c of the housing 3 and is housed in the recess 3x. The second portion 42 extends slenderly along the longitudinal direction (the direction extending along the end 3c) of the recess 3x from a first end to a second end of the recess 3x. The second portion 42 has a plurality of walls 42c (outer walls, portions, plates, frames). The walls 42c comprise, for example, a wall 42c1 that has an opening 42r from which an operating portion 44b is exposed. The first portion 41 and the second portion 42 may be formed of, for example, a metallic material or a synthetic resin material. The first portion 41 and the second portion 42 may comprise, for example, a plurality of components (housing members, divided bodies) combined with each other.

In the embodiment, for example, the protrusions 43, the hooks 44a, and the connectors 45 each protrude from the wall 41c1 of the end 41a. When the housing 2 is mounted on the housing 4, the protrusions 43, the hooks 44a, and the connectors 45 each advance into the housing 2 through respective openings not illustrated in the housing 2. In the housing 2, the protrusions 43 abut on the housing 2 or members fixed to the housing 2 to thereby prevent the housing 2 from moving in a direction crossing (e.g., an orthogonal direction to) the direction in which the protrusions 43 protrude (in the direction in which the housing 2 is removed). Specifically, the protrusions 43 can function as portions that position the housing 2 in the direction crossing the direction in which the protrusions 43 protrude. It is noted that the protrusions 43 can also function as portions that position the housing 2 in the direction in which the protrusions 43 protrude (in which the housing 2 is mounted). The protrusions 43 can also function as guides when the housing 2 is mounted on, or removed from, the housing 4.

The hooks 44a (hook portions) protrude from openings 41r formed in the wall 41c1. The openings 41r extend along the end 41a. The hooks 44a are supported by the housing 4 so as to be movable (reciprocable) along the longitudinal direction of the openings 41r (the end 41a). In addition, the operating portion 44b (operator) is exposed from the wall 42c1 through the opening 42r that extends along the end 41a. The operating portion 44b and the hooks 44a are coupled to each other inside the housing 4 and move integrally along the end 41a. The hooks 44a each have a claw 44c that protrudes toward one direction along the end 41a (to the right in FIG. 3). Additionally, at least ones of the hooks 44a and the claws 44c are urged by an elastic member (e.g., a coil spring) in the direction in which the claws 44c protrude (the side of a position P1). In the embodiment, for example, moving (sliding) the operating portion 44b in the direction opposite the claws 44c (to the left in FIG. 3) allows the hooks 44a to be moved from the position P1 (a first position; see FIG. 3) at which the housing 2 is locked to a position P2 (a second position; see FIG. 4) at which the housing 2 is unlocked. The hooks 44a are hooked inside the housing 2 onto the housing 2 or members fixed to the housing 2 when the housing 2 is mounted on the housing 4, thereby preventing the housing 2 from being removed from the housing 4. Specifically, the hooks 44a function as a lock for the housing 2.

The connectors 45 protrude from openings 41s formed in the wall 41c1. The connectors 45 are electrically connected inside the housing 4 to electric components (e.g., the substrate 34) on the side of the housing 3 through wires. When the housing 2 is mounted on the housing 4, the connectors 45 are mechanically and electrically connected in the housing 2 to connectors (not illustrated) on the side of the housing 2. The connection established between the connectors 45 of the housing 4 and the connectors of the housing 2 enables various types of data and electricity, for example, to be sent and received between the electric components of the housing 2 and the electric components of the housing 3.

As illustrated in FIG. 7, in the embodiment, the hinge 18 is provided across the housing 3 and the second portion 42 of the housing 4. The hinge 18 comprises, for example, a shaft 18a (a rotational shaft), a coupling portion 18b (see FIG. 9), and a supporting portion 18c. The shaft 18a extends along the end 3c. Specifically, in the embodiment, the shaft 18a has an axis extending substantially in parallel with the direction along which the end 3c extends. In the embodiment, the shaft 18a is formed into a cylindrical shape. The coupling portion 18b (see FIG. 9) is fixed (unrotatably) to the shaft 18a, thereby coupling the shaft 18a to the housing 3. The supporting portion 18c is coupled to the housing 4 to thereby rotatably support the shaft 18a about the rotational center Ax. A plurality of resisting members are provided around the supporting portion 18c, the resisting members having an annular and disc-spring shape so as to surround the shaft 18a. The resisting members, with their elastic forces, impart a pressing force (a friction force) between the supporting portion 18c and the shaft 18a. This configuration creates friction resistance torque (or holding torque to retain posture) when the supporting portion 18c (the housing 4) rotates relative to the shaft 18a (the housing 3). In the embodiment, the hinge 18 having the arrangements as described above connects the housing 3 and the housing 4 rotatably about the rotational center Ax. It is noted that, in the embodiment, the hinge 18 is provided on each of both sides in the axial direction of the second portion 42 of the housing 4. The hinge 18 may nonetheless be provided only on one side in the axial direction.

Figure 6:
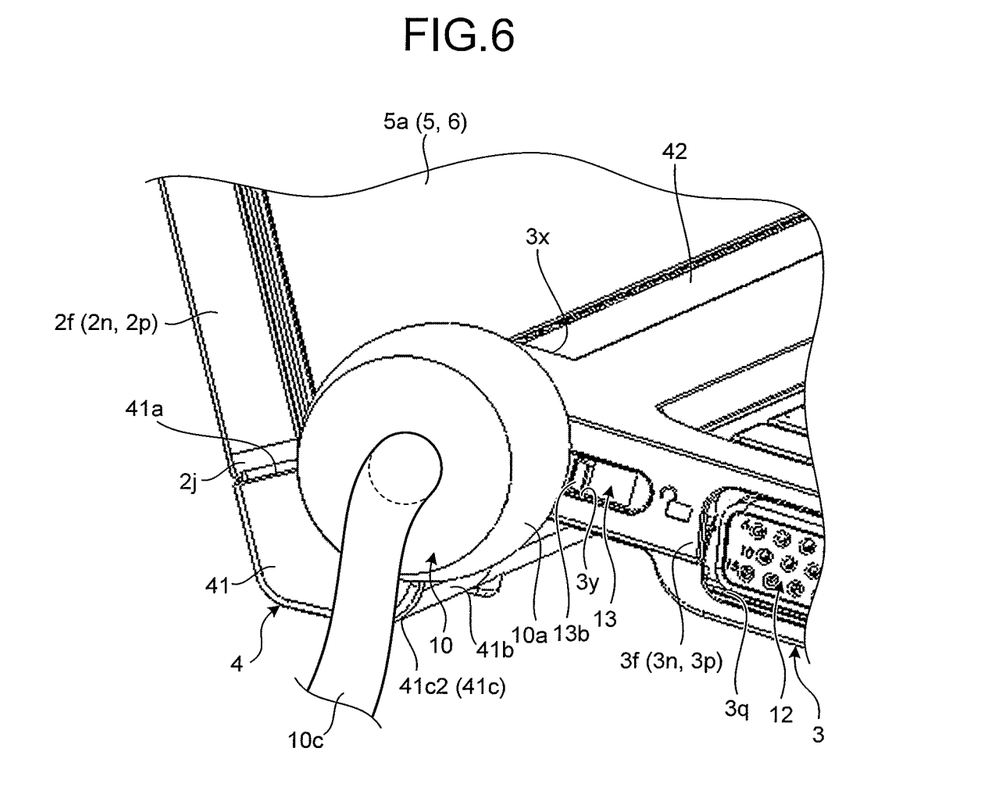
FIG. 6 is an exemplary perspective view of the electronic device to which a coupling apparatus is attached, in the embodiment.

In the embodiment, for example, as illustrated in FIG. 6, a well-known coupling apparatus (a locking apparatus, a motion restricting apparatus, a theft preventing apparatus) may be mounted to the housing 3. The coupling apparatus comprises, for example, a housing 10a (a supporting portion, a body, a main body, a fixing portion, a first portion), the hook member 10b (a lock member, a hook member, a key member, a second portion; see FIG. 7), and a wire 10c. The wire 10c has a first end fixed to the housing 10a. The wire 10c has a second end on which an annular portion (a ring portion) not illustrated is provided. The second end (the annular portion) of the wire 10c is, for example, first coupled to a structure (e.g., a leg of a desk) around the electronic device 1 and the first end of the wire 10c is coupled to the housing 3 (the electronic device 1). The housing 3 (the electronic device 1) on which the coupling apparatus is attached can thus no longer be moved farther than a position at which the wire 10c is fully extended. Specifically, the coupling apparatus restricts movement (e.g., unintentional movement, theft) of the housing 3 (the electronic device 1).

Figure 8:
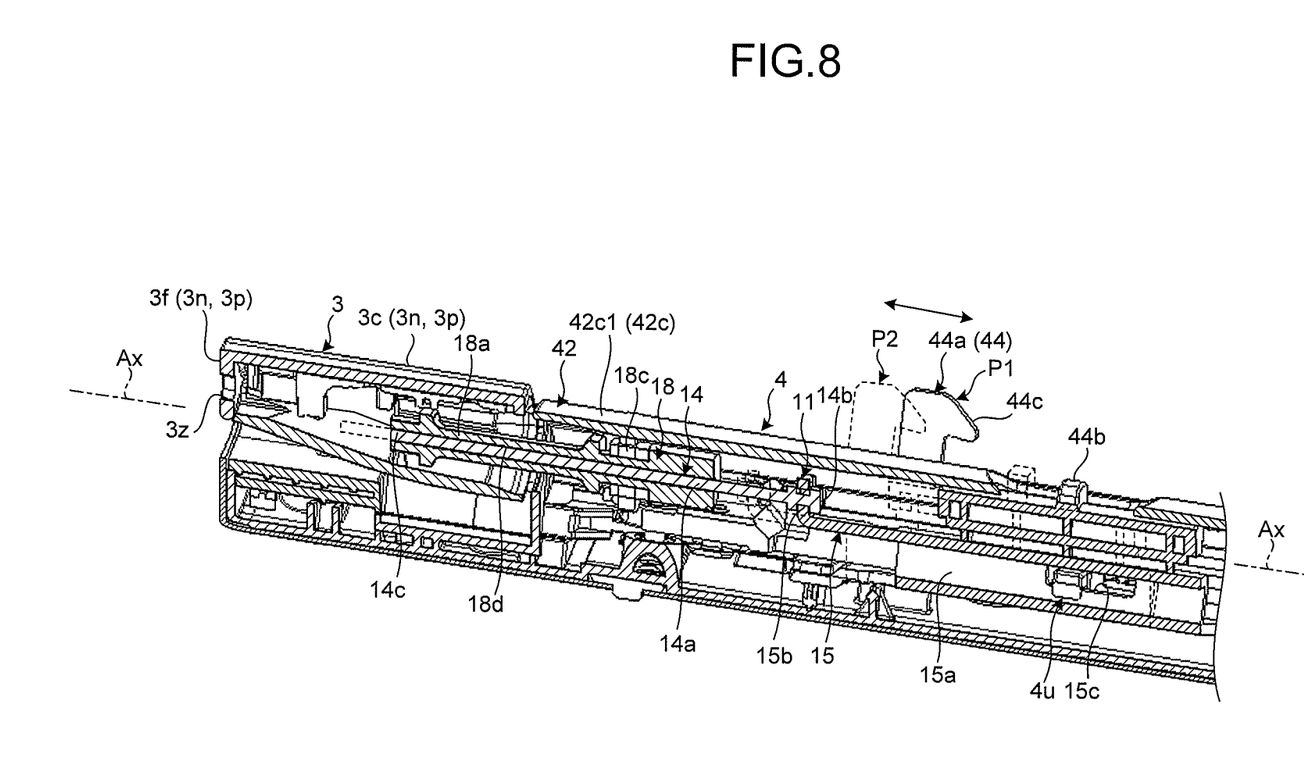
FIG. 8 is an exemplary cross-sectional view of the first housing and the second housing of the electronic device and illustrating an unlocked position (a fourth position) at which the second movable member unlocks the first movable member, in the embodiment.
Figure 9:
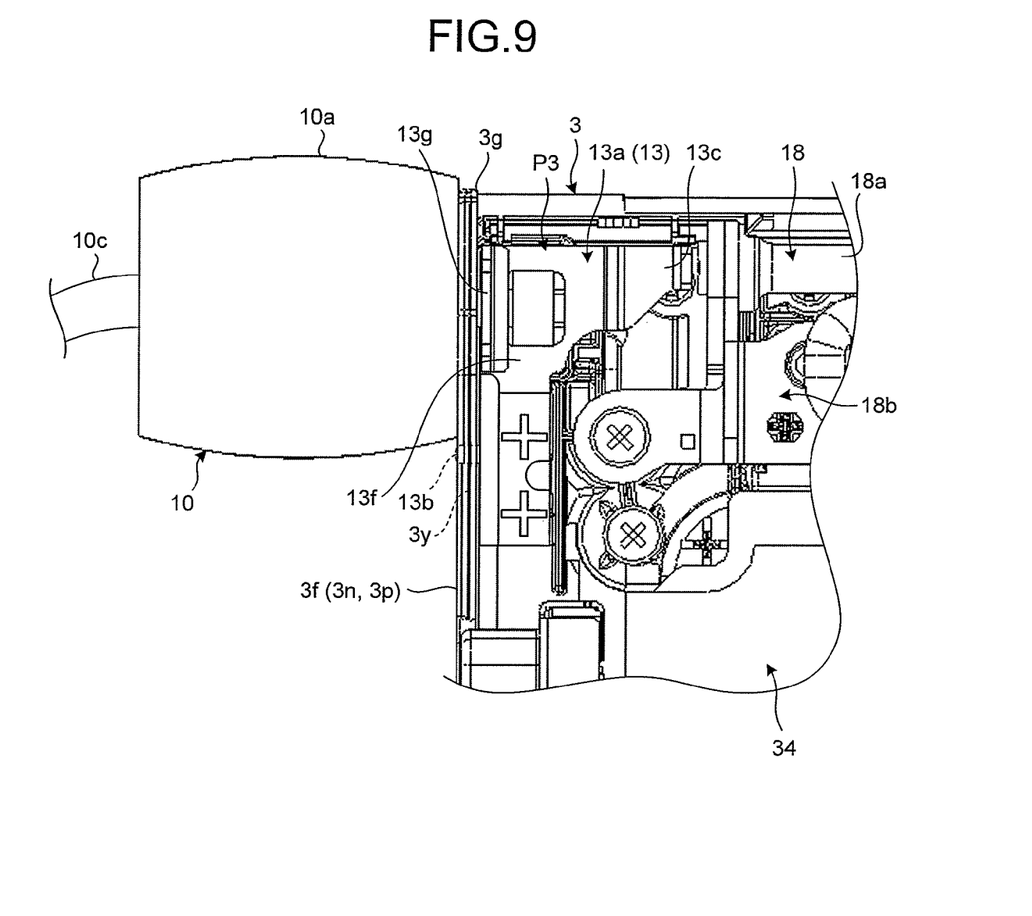
FIG. 9 is an exemplary plan view (perspective view) illustrating the locked position (the third position) achieved by the second movable member of the electronic device in the embodiment.
Figure 10:
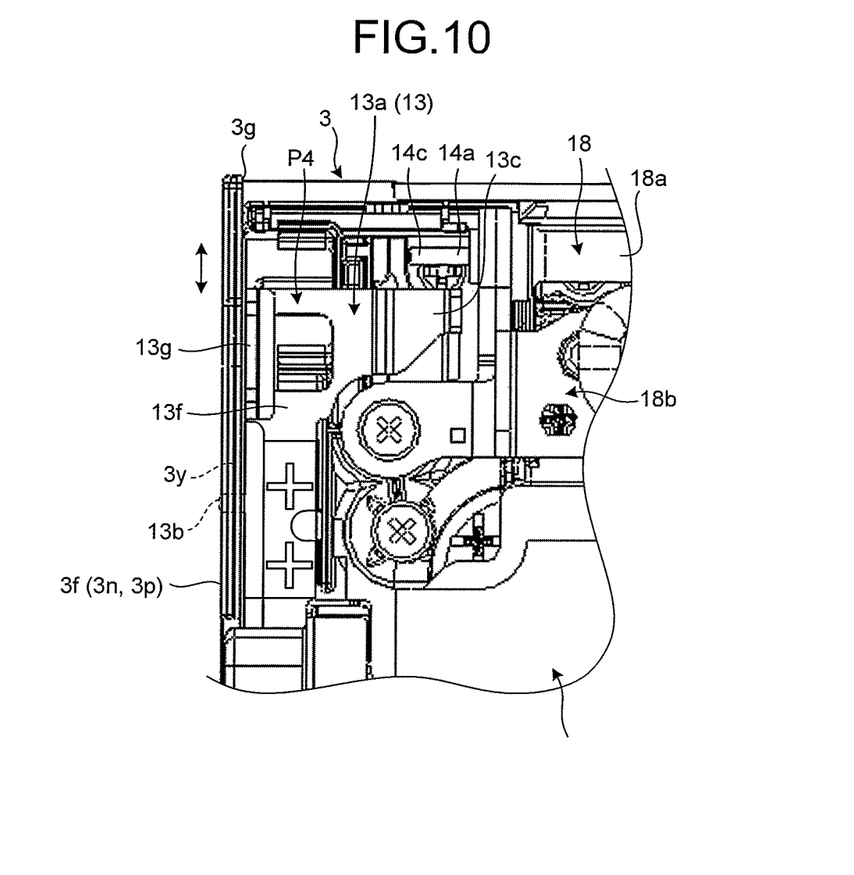
FIG. 10 is an exemplary plan view (perspective view) illustrating the unlocked position (the fourth position) achieved by the second movable member of the electronic device in the embodiment.

In the embodiment, for example, as illustrated in FIGS. 7 to 10, a plurality of (e.g., three) movable members 11, 13, and 44 (locking members, motion restricting members, sliders) are provided in the housing 3. As illustrated in FIGS. 9 and 10, the movable member 13 is for example supported by the housing 3 movably (reciprocably) along the end 3f of the housing 3. Specifically, the movable member 13 is configured so as to be movable between a position P3 (a third position; see FIGS. 7 and 9) at which at least a portion thereof (an end 13d) axially overlaps the movable member 11 (a shaft 14a) and a position P4 (a fourth position; see FIGS. 8 and 10) at which at least the portion thereof (the end 13d) is spaced apart from the movable member 11 (the shaft 14a) in the direction extending along the end 3f. As illustrated in FIGS. 7 and 8, the movable member 11 is integrated with the movable members 44 and supported by the housing 4 movably (reciprocably) along the end 3c of the housing 3. In the embodiment, for example, when the movable member 13 is positioned at the position P3, the movable members 11 and 44 cannot be moved from the position P1 to the position P2 (see FIG. 7). Thus, the housing 2 can be prevented from being removed from the housing 4. In addition, passing the hook member 10b of the coupling apparatus through the opening 3z in the housing 3 (and an opening 13e in the movable member 13) under this condition prevents the housing 3 (the electronic device 1) from being moved (stolen). With the movable member 13 positioned at the position P4, the movable members 11 and 44 can be moved from the position P1 to the position P2 (see FIG. 8). In the embodiment, the movable member 11 is an exemplary first movable member, the movable member 13 is an exemplary second movable member and an exemplary first movable portion, and the movable members 44 are an exemplary third movable member and an exemplary second movable portion.

As illustrated in FIG. 7, the movable member 11 for example comprises a first member 14 and a second member 15. The first member 14 (a rod) comprises the shaft 14a extending along the axial direction (the end 3c) and a connecting portion 14b provided at an end on a first side (the side of the second member 15) of the shaft 14a. In the embodiment, the shaft 14a is for example formed into a slender cylindrical shape and inserted in an opening 18d having a cylindrical inner surface in the shaft 18a of the hinge 18. The shaft 14a has an outside diameter slightly smaller than the inside diameter of the opening 18d. The first member 14 is movably supported by the shaft 18a in the axial direction (in the longitudinal direction, the direction extending along the rotational center Ax) in the opening 18d in the shaft 18a and relatively rotatably (circumferentially) about the axis of the opening 18d in the opening 18d. The opening 18d has the rotational center Ax as its axis. Specifically, the first member 14 extends along the rotational center Ax, or exemplarily, substantially in parallel or in alignment with the rotational center Ax and is provided near or to overlap the rotational center Ax. Additionally, the first member 14 is provided so as to be movable along the rotational center Ax. The first member 14 is provided so as to be relatively rotatable about the axis of at least one of the housing 3 and the housing 4. With the first member 14 (the movable member 11) positioned at the position P1, (an end face of) an end 14c provided on a second side (the side opposite to the second member 15) of the shaft 14a is substantially aligned with (an end face of) an end on a second side in the axial direction of the shaft 18a. With the first member 14 (the movable member 11) positioned at the position P2 (see FIG. 8), the end 14c of the shaft 14a protrudes from the end of the second side of the shaft 18a into a space in which the movable member 13 is provided.

The second member 15 comprises, for example, a base portion 15a that extends in the axial direction (along the end 3c) and a connecting portion 15b provided at an end on a second side (the side of the first member 14) of the base portion 15a. The connecting portion 14b and the connecting portion 15b, when connected to each other, result in the first member 14 and the second member 15 being operatively associated with each other at least in the direction extending along the end 3c (the direction extending along the rotational center Ax). In addition, the base portion 15a has an opening 15c that extends in the direction extending along the end 3c. The opening 15c receives a protrusion 4u (a hook portion) of the housing 4 inserted therein. The protrusion 4u is also inserted in an opening not illustrated in each of the movable members 44. This configuration allows the movable members 11 and 44 to be moved (reciprocable) relative to the protrusion 4u (the housing 4) in the direction extending along the end 3c. The second member 15 is integrated with a movable member of the operating portion 44b. The operating portion 44b can be integrated with the hooks 44a via the second member 15. It is noted that the first member 14 does not necessarily have to be relatively rotatable in the opening 18d relative to the shaft 18a. Additionally, the connecting portion 14b of the first member 14 and the connecting portion 15b of the second member 15 may be connected relatively rotatably with each other.

As illustrated in FIG. 9, the movable member 13 is provided adjacent to the corner 3g (the openings 3y and 3z) of the housing 3. The movable member 13 comprises, for example, a base 13a (a body, a main body), the operating portion 13b (the operator), and a protruding portion 13c. The base 13a comprises a wall 13f (a bottom wall) that extends along the end 3f of the housing 3 and a wall 13g (a side wall) provided on a first side (on the side of the corner 3g) in the longitudinal direction of the wall 13f and protruding in the thickness direction of the housing 3 from a second side (the side of the end 3f) in the width direction of the wall 13f. The wall 13g overlaps the wall 3n on the end 3f inside the housing 3. As illustrated in FIG. 7, the wall 13g has an opening 13e that is aligned with the opening 3z in the housing 3. The opening 13e is formed into a slot extending along the end 3f.

The operating portion 13b is provided on a second side (on the side of the opening 3y) in the longitudinal direction of the wall 13f. The operating portion 13b protrudes from the second side (the side of the end 3f) in the width direction of the wall 13f to the outside of the housing 3 through the opening 3y. The protruding portion 13c is provided on the first side (on the side of the corner 3g) in the longitudinal direction of the wall 13f and protrudes from a first side (the side of the hinge 18) in the width direction of the wall 13f toward the first side. The end 13d (the tip) of the protruding portion 13c extends along the thickness direction of the housing 3. As illustrated in FIGS. 7 and 9, in the embodiment, with the movable member 13 positioned at the position P3, the end 13d of the protruding portion 13c faces the end 14c on the second side of the shaft 14a with a slight clearance therebetween. Under this condition, the slot-shaped opening 3z and the slot-shaped opening 13e are substantially generally aligned with each other, so that the hook member 10b can pass through the two openings 3z and 13e. When the movable member 13 is positioned at the position P4, the end 13d of the protruding portion 13c is spaced apart from the end 14c on the second side of the shaft 14a toward the end 3f, and the opening 3z and the opening 13e are deviated relatively from each other in the direction extending along the end 3f, so that the hook member 10b cannot pass through the two openings 3z and 13e.

As illustrated in FIG. 7, the hook member 10b is formed into, for example, a T-shape and comprises a shaft 10e that extends from the housing 10a and a claw 10f (a hook) on the tip side thereof. The claw 10f of the hook member 10b is first passed through the two slot-shaped openings 3z and 13e with the movable member 13 positioned at the position P3 and is then rotated, for example, 90° about the shaft 10e.

This arrangement achieves a condition in which, as illustrated in FIG. 7, the wall 3n and the wall 13g are clamped between the housing 10a and the claw 10f, specifically, a condition in which the coupling apparatus is coupled to and locked in the housing 3 (the electronic device 1). In addition, the hook member 10b can be rotated (locked) by the user or the like when he or she inserts a key not illustrated from the side opposite to the hook member 10b (from the back side) and rotates the key. Additionally, the rotation of the key by the user or the like allows the coupling apparatus to be disengaged (or unlocked) from the housing 3 (the electronic device 1). The hook member 10b does not necessarily have to be T-shaped and may be formed into an L-shape, for example. The movable member 13 has only to be shaped so as to be retained at the position P3 by the hook member 10b and the embodiment is not restrictive.

As described heretofore, in the embodiment, exemplarily, the movable member 11 (the first movable member) is provided across the housing 3 (the first housing) and the housing 4 (the second housing). The movable member 11 is movable between the position P1 (the first position) at which the housing 2 (the third housing) is locked in the housing 4 and the position P2 (the second position) at which the housing 2 can be unlocked from the housing 4. The movable member 11 is configured so as to be prevented from moving from the position P1 to the position P2 when the hook member 10b passes through the opening 3z (the first opening). Thus, in the embodiment, for example, the movable member 11 can restrict the movement of the housing 3 (the electronic device 1) and the removal of the housing 2. In the embodiment, therefore, exemplarily, as compared with a configuration having separate mechanisms for restricting the movement of the housing 3 and for restricting the removal of the housing 2, the separate mechanisms requiring that an operator perform individual operations separately, the operator can perform the operations, which can be done simultaneously, more easily and more quickly.

According to the embodiment, for example, there is provided the movable member 13 (the second movable member) that is supported by the housing 3 (the first housing) so as to be movable between the position P3 (the third position) at which the movable member 11 (the first movable member) is locked at the position P1 (the first position) and the position P4 (the fourth position) at which the movable member 11 (the first movable member) is unlocked. Further, the movable member 13 is retained at the position P3 (the third position) when the hook member 10b passes through the opening 3z (the first opening). Therefore, according to the embodiment, for example, the degree of freedom in the layout of the movable members 11 and 13 and the coupling apparatus tends to be enhanced compared with a configuration having the movable member 11 formed of a single member. Additionally, according to the embodiment, for example, when the movable member 13 is positioned at the position P3, the movable member 11 can be prevented from moving from the position P1 to the position P2 even with the hook member 10b not being coupled. Thus, even under an ordinary use condition in which the hook member 10b is not coupled, for example, the operation of the operating portion 13b in the housing 3 advantageously prevents the housing 2 from being removed (e.g., unintentionally removed). Specifically, with respect to the two housings 3 and 4 (components) coupled to each other rotatably about the rotational center Ax, the movable member 11 is an exemplary component that imparts an operation or movement of a movable portion in either one (the housing 3) of the two housings 3 and 4 (components) to the other (the housing 4); specifically, the movable member 11 is an exemplary imparting component that causes a second component to perform an operation (function) based on an operation or movement of a movable portion in a first component. The movable member 11 is also an exemplary component (imparting component) that causes, through movement of a movable portion (e.g., the operating portion 13b, the movable member 13) in either one (the housing 3) of the two housings 3 and 4 (components), another movable portion (the hook portion 44a, the movable member 44) in the other (the housing 4) to move.

According to the embodiment, for example, there is provided the movable members 44 (the third movable members) that comprise the hooks 44a onto which the housing 2 (the third housing) is hooked and that are supported by the housing 4 (the second housing) so as to be movable in operative association with the movable member 11 (the first movable member). Thus, according to the embodiment, for example, the degree of freedom in the configuration and layout of the movable members 11 and 44 and the hooks 44a tends to be enhanced compared with a configuration having the movable member 11 formed of a single member. Thus, the movable members 11 and 44 and the hooks 44a can for example be manufactured and assembled more easily. In the embodiment, exemplarily, the movable member 11 comprises the first member 14 and the second member 15 as separate members. Thus, for example, as compared with a case in which the movable member 11 is formed of a single member, the degree of freedom in the configuration and layout of the movable member 11 tends to be enhanced. Thus, exemplarily, the movable member 11 can be manufactured and assembled more easily.

According to the embodiment, for example, the movable member 11 is movable along the rotational center Ax. Thus, according to the embodiment, for example, the movable member 11 (the first member 14) can be provided across the housing 3 and the housing 4 in a condition of causing less inconvenience. Specifically, for example, the movable member 11 can have a smaller movable range than with a case in which the movable member 11 moves circumferentially or radially about the rotational center Ax. This configuration exemplarily reduces impediments to the layout of other components.

According to the embodiment, for example, the hinge 18 comprises the cylindrical shaft 18a and the movable member 11 (the first movable member) is configured to be movable inside the shaft 18a. Thus, exemplarily in the embodiment, the movable member 11 (the first member 14) can be provided across the housing 3 and the housing 4 in a condition of causing less inconvenience. Specifically, for example, the movable member 11 is covered in the hinge 18. Thus, as compared with a case in which the movable member 11 is provided outside the hinge 18, appearance in a boundary between the housing 3 and the housing 4 is less likely to be impaired. Additionally, exemplarily, the operation of the movable member 11 is less likely to be inhibited by another component such as a wire. If the movable member 11 and the hinge 18 are provided separately from each other, a space is newly required for passing the hinge 18 and the movable member 11 therethrough between the housing 3 and the housing 4. This configuration can increase the size of the opening in the housings 3 and 4 through which the hinge 18 is passed and impede the layout of other components. In this respect, the embodiment permits even more compact arrangements of the movable member 11 and the hinge 18 in and across the housings 3 and 4. In addition, for example, the circumferential movement of the movable member 11 can be made smaller relative to the relative rotation of the housings 3 and 4 about the rotational center Ax, which does not readily impede the layout of other components.

It is understood that the embodiment is not limited to the one described above exemplarily for the electronic device 1 that comprises the three housings 2, 3, and 4. The electronic device 1 may, for example, comprise two removable housings or comprise two undetachable housings. Furthermore, according to the embodiment, the movable member 11 for example prevents the housing 2 from being removed from the housing 4. The movable member 11 may nonetheless be configured so as to prevent other components such as an SD card from being removed.

In the embodiment, an apparatus for example comprises a first component comprising a first movable portion, a second component connected to the first component rotatably about the rotational center and comprising a second movable portion, and a movable member provided across the first component and the second component so as to be movable along the rotational center. Further, the movable member imparts motion of the first movable portion to the second movable portion. Therefore, for example the apparatus is capable of imparting, between the two components connected mutually rotatably about the rotational center, the motion of the first movable portion to the second movable portion through a configuration causing less inconvenience. According to the embodiment, for example, the first movable portion restricts movement of the apparatus and the second movable portion restricts movement of another component from the second component; specifically, the first movable portion and the second movable portion each perform a unique function involving movement or stop. Thus, according to the embodiment, for example, a plurality of functions can be enabled or disabled simultaneously between two components connected mutually rotatably about the rotational center. The apparatus is, for example, a portable apparatus. The apparatus is not limited to an electronic device.

The invention can be achieved by any configuration other than those disclosed in the embodiment described above. Additionally, the invention can achieve the various effects (including derivative ones) achieved by the basic configurations (technical features). Each of the elements may be embodied with their specifications (including the structure, type, orientation, shape, size, length, width, thickness, height, quantity, disposition, position, and material) changed as appropriate. For example, the first movable member may be provided so as to extend along, or cover (e.g., wrap the outer circumference of) the shaft portion of the hinge portion. Additionally exemplarily, the hinge portion may be passed through one (e.g., the left one) of the two openings (e.g., left and right openings in a front elevational view of the display screen) formed along the rotational center of the two housings, and the first movable member may be passed through the other (e.g., the right one). The movable portion moved by the second housing (component) is not limited to the member comprising a hook. The function achieved at the second housing (component) by the operation or movement of the first movable portion in the first housing (component) being imparted to the second movable portion of the second housing (component) via the first movable member is not limited to the removal of the third housing. Additionally, the direction in which the first movable member is moved does not necessarily have to be in complete parallel with the rotational center.

Moreover, the various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic device comprising:
a first housing comprising a first opening through which the electronic device is capable of being coupled to an external coupling apparatus;
a second housing rotatably connected to the first housing;
a third housing removably attached to the second housing;
a first movable member across the first housing and the second housing, movable between a first position at which the third housing is locked to the second housing and a second position at which the third housing is capable of being unlocked from the second housing, and configured to be restricted from moving from the first position to the second position when the electronic device is coupled through the first opening; and
a second movable member provided in the first housing and movably supported by the first housing between a third position at which the first movable member is locked at the first position and a fourth position at which the first movable member is unlocked, the second movable member configured to be retained at the third position when a hook is passing through the first opening.

2. The electronic device of claim 1, further comprising a third movable member comprising a hook onto which the third housing is hooked, the third member configured to be supported by the second housing to be movable in association with the first movable member.

3. The electronic device of claim 1, wherein the first movable member is movable along rotational center of the first housing and the second housing.

4. The electronic device of claim 1, further comprising:
a hinge between the first housing and the second housing, and comprising a cylindrical shaft, wherein
the first movable member is configured to be movable through the shaft.

5. An apparatus comprising:
a first component comprising a first movable portion;
a second component rotatably connected to the first component about rotational center, the second component comprising a second movable portion; and
a movable member movable along the rotational center and across the first component and the second component, the movable member configured to impart motion of the first movable portion to the second movable portion.

* * * * *